(12) United States Patent
Lorenz

(10) Patent No.: US 11,364,615 B2
(45) Date of Patent: Jun. 21, 2022

(54) SYSTEM FOR ACTUATING AT LEAST TWO CONSUMER UNITS BY MEANS OF A HYDRAULIC MOTOR

(71) Applicant: SEPPI M. SPA, Zona artigianale (IT)

(72) Inventor: Seppi Lorenz, Zona artigianale (IT)

(73) Assignee: SEPPI M. SPA, Caldaro Sulla Strade del Vino (IT)

( * ) Notice: Subject to any disclaimer, the term of this patent is extended or adjusted under 35 U.S.C. 154(b) by 0 days.

(21) Appl. No.: 17/170,985

(22) Filed: Feb. 9, 2021

(65) Prior Publication Data

US 2021/0252687 A1 Aug. 19, 2021

(30) Foreign Application Priority Data

Feb. 13, 2020 (IT) .......................... 102020000002881

(51) Int. Cl.
*F15B 13/02* (2006.01)
*B25F 5/00* (2006.01)

(52) U.S. Cl.
CPC .............. *B25F 5/005* (2013.01); *F15B 13/02* (2013.01); *F15B 2211/20576* (2013.01); *F15B 2211/613* (2013.01)

(58) Field of Classification Search
CPC ........................ F15B 13/02; F15B 13/06; F15B 2211/20576; F15B 2211/61; F15B 2211/613; F15B 2211/40584; F15B 11/17; F15B 2211/7121
See application file for complete search history.

(56) References Cited

U.S. PATENT DOCUMENTS

| 3,981,149 A | * | 9/1976 | Rice ......................... F15B 11/16 60/585 |
| 4,553,391 A | | 11/1985 | Reinhardt |
| 2013/0180237 A1 | | 7/2013 | Recoura et al. |
| 2015/0048188 A1 | | 2/2015 | Harsia |

FOREIGN PATENT DOCUMENTS

| DE | 2031112 | 12/1971 |
| EP | 0084800 | 8/1983 |
| EP | 3101179 | 12/2016 |
| FR | 2825421 | 12/2002 |

* cited by examiner

*Primary Examiner* — Thomas E Lazo
*Assistant Examiner* — Daniel S Collins
(74) *Attorney, Agent, or Firm* — Jacobson Holman PLLC

(57) ABSTRACT

The invention relates to a system for hydraulic actuation of multiple consumer units comprising a hydraulic circuit (130) operated by means of a hydraulic motor (122) which actuates a consumer unit (111) wherein, downstream of the first consumer unit (111), the hydraulic circuit (130) has at least one secondary circuit (140, 150) having at least a second consumer unit (114, 118) and arranged before the second consumer unit (114) and a pump (113, 117) directly or indirectly actuated by the first consumer unit (111).

4 Claims, 2 Drawing Sheets

SYSTEM FOR ACTUATING AT LEAST TWO CONSUMER UNITS BY MEANS OF A HYDRAULIC MOTOR

BACKGROUND OF THE INVENTION

The present invention relates to A system for actuating at least two consumer units by means of a hydraulic motor according to the claims.

The invention finds application in the field of agricultural machines, namely agricultural machines having a tool rotor and a feeding system.

U.S. Pat. No. 9,512,859 discloses a hydraulic transmission circuit comprising three or four connected hydraulic motors. Here all the consumer units are connected in parallel. There is no priority consumer unit that absorbs or can absorb power. Therefore, the system must be sized to allow all the consumer units to always absorb the maximum power. This entails considerable drawbacks in that the system is oversized most of the time.

SUMMARY OF THE INVENTION

The object of the present invention is to provide a system that has a main consumer unit preceding the secondary users.

This object is achieved by a system as defined in the claims.

A system for operating at least two consumer units by means of a hydraulic circuit is provided, wherein a first consumer unit is arranged before at least one second consumer unit and wherein a pump actuated by the first consumer unit is provided in the feeding circuit of the second consumer unit.

This system may be particularly used when a rotor tool is provided, which is designed to shred or process material such as biomass which is supplied, for example, via at least one feeding rotor, preferably two feeding rotors. As a result of work unevenness, especially due to a possibly variable biomass, the power request for the tool rotor which shreds the material may vary. Therefore, if the feeding rotor and/or the feeding rotors require a discontinuous power for the tool rotor which shreds the material, the power will not be sufficient to shred and/or process the biomass. In particular the fluid flow in the hydraulic circuit remains constant, whereas the pressure absorbed by the consumer unit varies according to the request. This may be particularly advantageous in case of obstructions and/or idling of the rotor/consumer unit.

A continuous fluid flow will be ensured toward all the consumer units, even when not constant pressures/powers are absorbed by the consumer units.

As a result a fluid flow will always be present in all the circuits, also in the circuits of secondary consumer units, because pumps are actuated by the main user, thereby maintaining a constant fluid flow. Furthermore, since the primary and secondary circuits are connected in series and not in parallel, the power/pressure shall not be divided upstream, but the system will do so automatically.

For example, assuming there are three circuits in parallel, with each circuit requiring a maximum fluid flow $Q1+Q2+Q3=Qmax$, they will absorb the maximum pressure difference $\Delta p1$ for the first circuit $\Delta p2$ for the second circuit and $\Delta p3$ for the third circuit and are $\Delta pmax=\Delta p1max=\Delta p2max=\Delta p3max$. The maximum pressure $Pmax=Qmax*\Delta pmax$.

On the other hand, if they are connected in series $Qmax=Q1$ (there is only one flow)
$Pmax=Qmax(Q1)*\Delta p1seriesmax+Qmax(Q1)*\Delta p2seriesmax+Qmax(Q1)*\Delta p3seriesmax$. Since $\Delta p1seriesmax$, $\Delta p2seriesmax$, $\Delta p3seriesmax$ depend on the current user request, if the latter is zero, for example for the secondary users 2 and 3 then $Pmax=Qmax(Q1)*\Delta p1seriesmax+Qmax(Q1)*\Delta p2seriesmax+Qmax(Q1)*\Delta p3seriesmax$ because $\Delta p2seriesmax=\Delta p3seriesmax=0$ $Pmax=Qmax(Q1)*\Delta p1seriesmax+0+0$.

Further objects, characteristics, advantages and application options result from the following description of a few exemplary embodiments and the accompanying drawings. Thus, all the characteristics as described and/or shown in the figures form by themselves or in any combination the object disclosed herein, also regardless of their being grouped in the claims or of their dependencies, whereas:

DETAILED DESCRIPTION OF THE INVENTION

Figure 1:
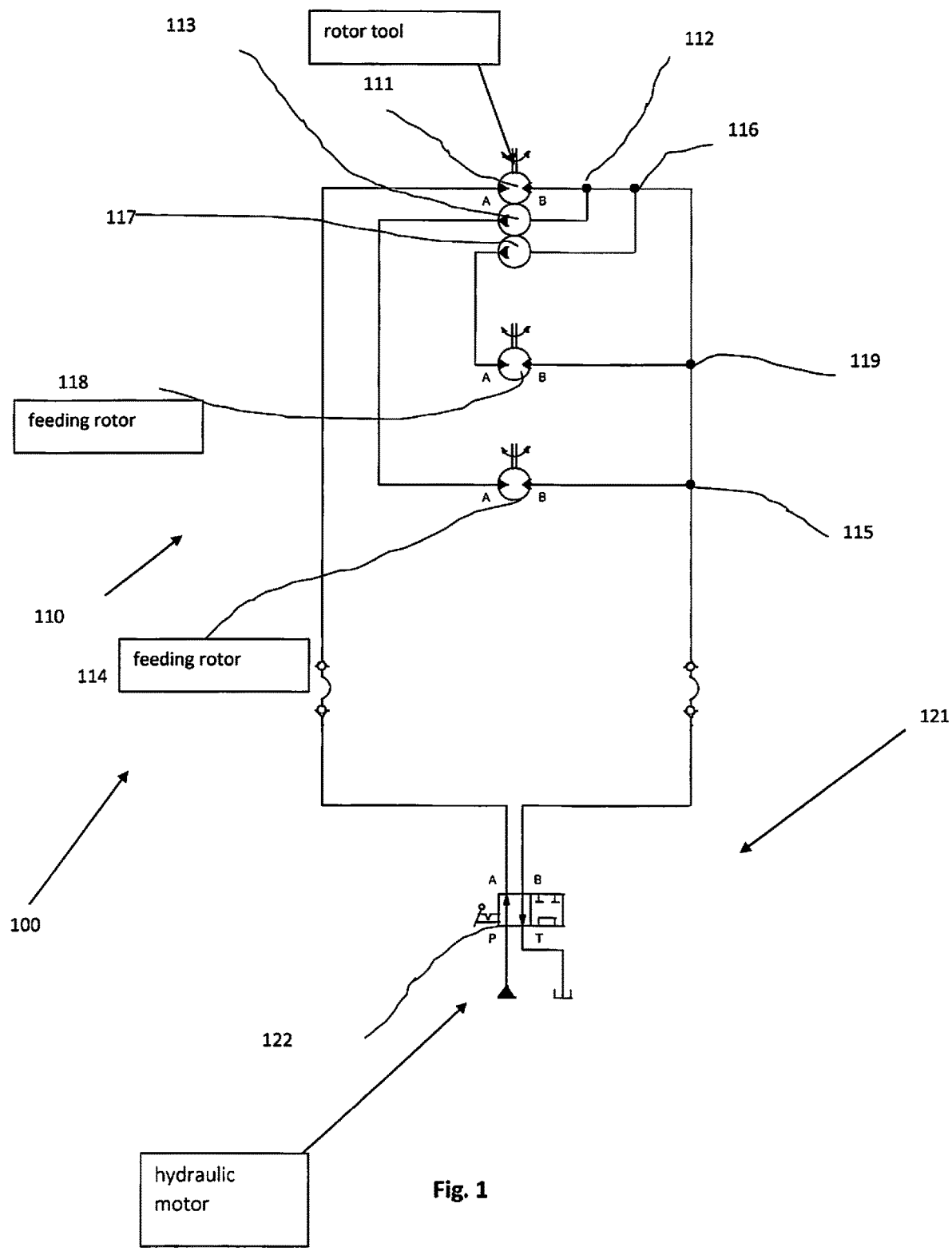
FIG. 1 shows a diagrammatic view of a circuit of the invention.
Figure 2:
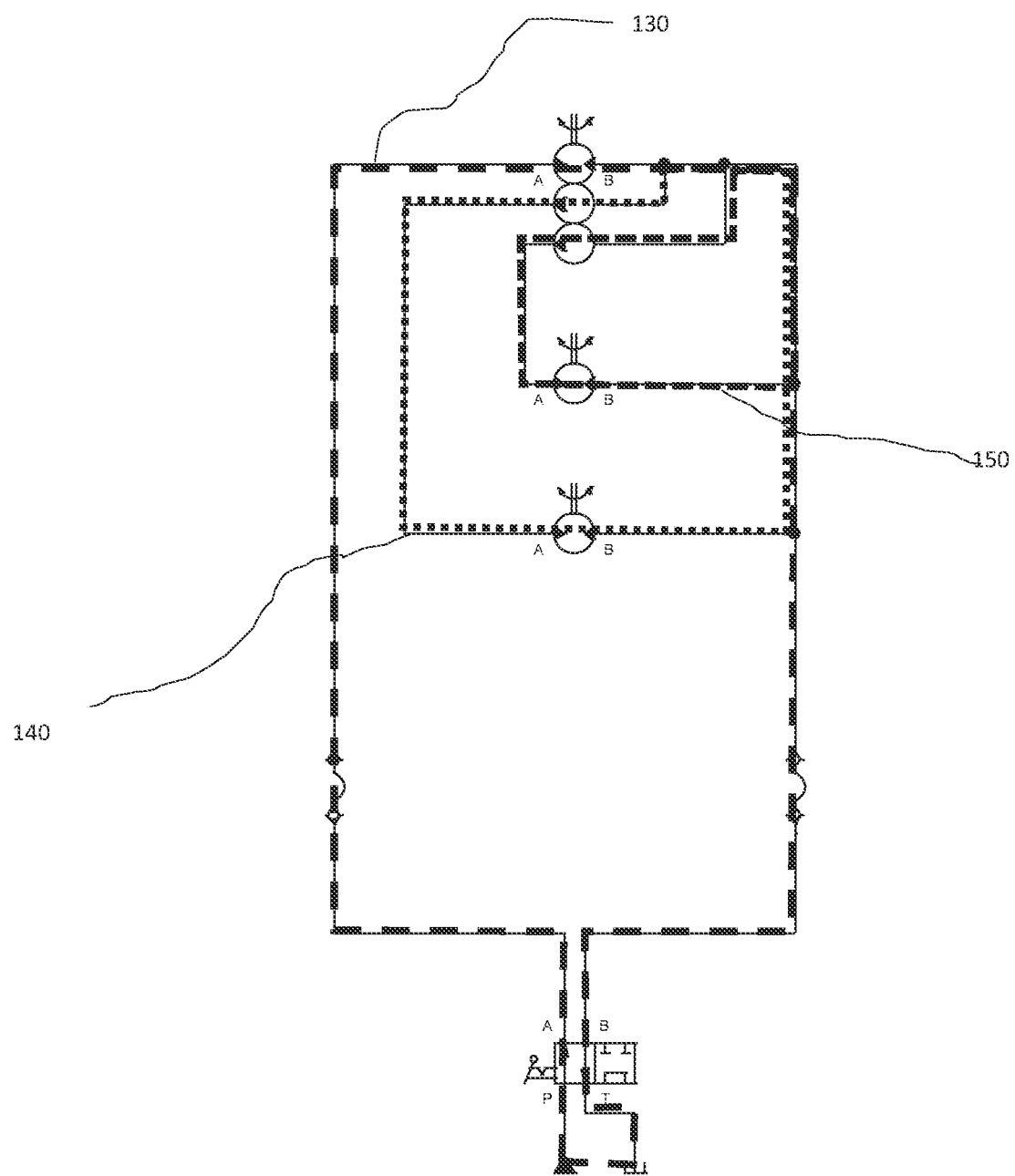
FIG. 2 shows the circuit of FIG. 1 with the indication of the primary and secondary circuits.

Numeral 100 designates a hydraulic actuation system for multiple consumer units, which consists of a hydraulic circuit 130 operated by means of a hydraulic motor 122 which actuates a first consumer unit 111 downstream of the first consumer unit 111, the hydraulic circuit 130 has at least one secondary hydraulic circuit 140 having at least a second consumer unit 114 and arranged before the second consumer unit 114 and a pump 113 directly or indirectly actuated by the first consumer unit 111. The embodiment as shown in FIG. 1 includes a second secondary circuit 150 with a third consumer unit 118 and arranged before the third consumer unit 118 and a second pump 117 also directly or indirectly actuated by the first user 111.

The actuating part 121 of the hydraulic circuit comprising the hydraulic motor 122 actuates all the consumer units arranged in the part of the system 100 in which the consumer units 110 are arranged. Advantageously the actuating part 121 may be arranged on a tractor or the like or consist of the tractor and/or the like. The part in which the consumer units 110 are arranged may be the machine for agricultural/forest use, which is connected to the tractor and to the hydraulic circuit of the tractor and/or of the machine for towing or carrying the machine for agricultural/forest use.

Preferably, the main consumer unit 111 is a tool rotor, which is used in agricultural machines. This motor has the pump 113 and 117 directly or indirectly connected thereto, which actuate the secondary consumer units which are preferably feeding producers, feeding the main rotor with biomass and the like, which is shredded by the main rotor.

The above described variants of the mechanism are only provided to better understand the structure, operation and properties of the solution as provided; they do not limit the disclosure to the exemplary embodiments. The figures are schematic, the essential properties and effects being partially shown in a magnified size, to clearly highlight the functions, principles of action, configurations and technical characteristics. Thus, each operation, each principle, each technical configuration and each characteristic as disclosed in the figures or in the text, may be provided in any free combination with all the claims, and with each characteristic in the text and the other figures, other operations, principles, configurations and technical characteristics contained in this disclosure or resulting therefrom, wherefore every conceivable combination shall be deemed to be encompassed by the above-described solution. This also includes combinations of all the individual disclosures in the text, i.e. In each paragraph of the text, in the claims and also in combinations of different variants in the text, sizes and figures. The details of the above described device and method are represented in the connection; nevertheless, it should be noted that they can be combined together even independent of each other and freely from each other. The ratios as shown in the figures of the individual parts and sections thereof and their sizes and proportions are not to be considered as limiting. Individual sizes and proportions may also differ from those as shown. The claims also do not limit the disclosure and hence the possibility to combine all the characteristics herein. All the characteristics herein are also disclosed individually and in combination with all the other characteristics.

LIST OF DRAWING REFERENCES

100 Hydraulic actuation system
110 Part with the consumer units
111 Main consumer unit
112 Inlet connection/deviation of the first secondary circuit
113 Pump
114 First secondary consumer unit
115 Outlet connection/deviation of the first secondary circuit
116 Inlet connection/deviation of the second secondary circuit
117 Pump
118 Second secondary consumer unit
119 Outlet connection/deviation of the second secondary circuit
121 Actuation part
122 Hydraulic motor
130 Hydraulic circuit
140 First secondary circuit
150 Second secondary circuit

The invention claimed is:

1. A system for hydraulic actuation of multiple consumer units comprising a hydraulic circuit operated by means of a hydraulic motor which actuates a first consumer unit, downstream of the first consumer unit, is at least one secondary circuit having at least one second consumer unit and the first consumer unit is arranged before the second consumer unit and a pump is directly or indirectly actuated by the first consumer unit, the at least one second consumer unit is a feeding rotor.

2. The system for hydraulic actuation of multiple consumer units as claimed in claim 1, wherein there are at least two secondary circuits which have a pump respectively arranged before each second consumer unit and directly or indirectly actuated by the first consumer unit.

3. The system for hydraulic actuation of a multiple consumer units as claimer wherein there are at least two Secondary circuits which have a pump respectively arranged before one of the second consumer units, and directly or indirectly actuated by the first consumer unit.

4. The system for hydraulic actuation of multiple consumer claimed claim 1, wherein the first consumer unit is a tool rotor.

* * * * *